United States Patent [19]

Phillips

[11] 4,140,034
[45] Feb. 20, 1979

[54] SAFETY LATHE DOG

[76] Inventor: Tennyson Phillips, 911 W. 9th St., Belvidere, Ill. 61008

[21] Appl. No.: 842,294

[22] Filed: Oct. 14, 1977

[51] Int. Cl.² .................................................. B23B 33/00
[52] U.S. Cl. .......................................................... 82/41
[58] Field of Search ............................................ 82/41

[56] References Cited

U.S. PATENT DOCUMENTS

| 2,898,785 | 8/1959 | Quick et al. ............... 408/115 X |
| 3,213,724 | 10/1965 | McMurtrie ........................ 82/41 |

FOREIGN PATENT DOCUMENTS

| 961316 | 1/1975 | Canada ........................ 82/41 |
| 635721 | 9/1936 | Fed. Rep. of Germany ........... 82/41 |
| 23842 of | 1896 | United Kingdom ................ 82/41 |
| 28711 of | 1914 | United Kingdom ................ 82/41 |

Primary Examiner—Leonidas Vlachos
Attorney, Agent, or Firm—McWilliams & Mann

[57] ABSTRACT

A statically balanced safety lathe dog for use with lathes of the type normally found in the average machine shop and which is characterized by the eccentricity of its mounting on the work to be turned whereby to effect a camming action in operation on the lathe and thereby act to push an operator's hand away from a danger area by a wiping action because of the sliding contact created by the camming feature of the dog rather than by the striking action of the typical or usual lathe dog.

2 Claims, 3 Drawing Figures

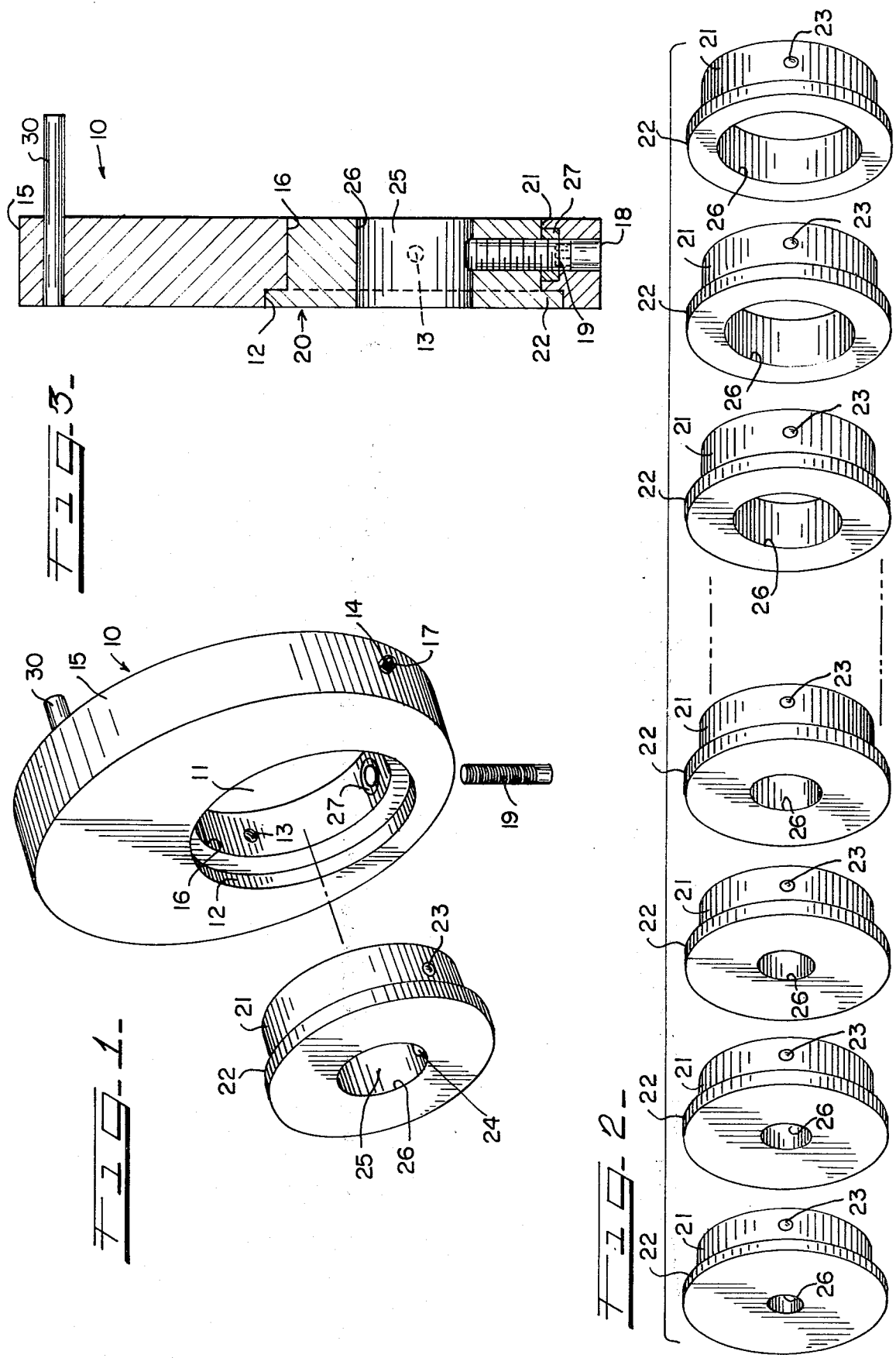

SAFETY LATHE DOG

BACKGROUND OF THE INVENTION

Heretofore the typical lathe dog included an opening for mounting on a workpiece and one or more set screws for securing the dog to the work. The mounting opening usually was centrally located and a projecting tailpiece, which in the typical lathe dog was bent at a right angle to the body portion of the dog for cooperation with a radially slotted face plate on the lathe, completes the conventional arrangement as generally utilized in the average machine shop. Some lathe dogs have included certain safety features but these have comprised nothing more than a smooth outer surface and avoiding any projecting elements such as by recessing the set screws for securing the lathe dog to the work which might otherwise catch an operator's clothing, or cut a hand or an arm. The present invention not only avoids such dangerous projections and provides a smooth outer surface but shapes the lathe dog and mounts it on the workpiece in such a manner that an operator's hand or arm coming in contact with the safety lathe dog is pushed out of danger by a rotary sliding action obtained by the camming effect of the eccentrically mounted dog member.

OBJECTS OF THE INVENTION

The primary object of the invention is to provide a statically balanced safety lathe dog adapted to push an operator's hand or arm out of the path of possible danger by a wiping action or sliding contact afforded by a rotary camming operation of the lathe dog eccentrically mounted on a workpiece.

The principal object of the invention is obtained by the provision of a safety lathe dog having an off-center opening for receiving a workpiece with the lathe dog in generally the form of a disc or plate having smooth outer surfaces with recessed screws installed through the perimetrical surface to secure the lathe dog to the workpiece.

Another object of the invention is the provision of a safety lathe dog in the form of a smooth surfaced disc or plate having an eccentrically disposed opening for the mounting of a workpiece and having removable insert members fitted in the eccentrically disposed opening and secured by set screws and each having a central opening of different size from that in any other insert whereby to receive the workpiece and adapt the safety lathe dog for use with workpieces of various sizes.

DESCRIPTION OF THE DRAWINGS

The foregoing and other and more specific objects of the invention are attained by the safety lathe dog structure illustrated in the accompanying drawings wherein:

FIG. 1 is an exploded perspective view of the safety lathe dog showing the cam-like dog member and removable insert in aligned spaced relation;

FIG. 2 is a perspective view of a series of insert members comprising a set of such inserts for various sizes of workpieces and graduated in size with respect to the central workpiece opening; and FIG. 3 is a vertical sectional view through the assembled cam-like dog member and insert member taken on the line 3—3 of FIG. 1.

SUMMARY OF THE INVENTION

In the use of this safety lathe dog an insert having a central opening of the proper size to fit the workpiece to be turned is selectively mounted in the eccentrically located opening of the lathe dog and secured by two recessed radially disposed set screws which are entered through the perimeter of the dog member and threaded through the dog member and extending through the insert to engage the workpiece directly and securely fasten the workpiece within the lathe dog assembly. Thus, with the workpiece secured in the central opening of the insert member and the insert secured in the eccentrically located opening of the disc shaped lathe dog it will readily be seen that the safety lathe dog rotating with the workpiece in the operation of the lathe, will move in an orbit about the workpiece so that the smooth perimeter of the disc-like dog member will function like a cam to push away any member coming in contact therewith by a sliding or wiping action as distinguished from the striking action of the lathe dogs heretofore utilized. The present lathe dog is provided with a laterally projecting pin one one face of the dog member which is adapted to engage in a radially extending slot of the usual face plate on a lathe which offsets the drive to the workpiece through the dog member.

DESCRIPTION OF PREFERRED EMBODIMENT

In the drawings 10 represents a disc-like plate member comprising the safety lathe dog of the invention and which is provided with an opening 11 extending therethrough. The opening 11 is disposed substantially to one side of the center of the disc-like dog member so that it is eccentrically located in the dog member. An undercut groove 12 extends entirely around the opening 11 adjacent one surface of the plate-like disc member 10 to provide an annular recess at this point. Diametrically opposed tapped openings 13 and 14 extend through the plate member 10 from the perimeter 15 to the inner circumferential wall 16 of the opening 11 for the reception of Allen type set screws 17 which in the applied position are recessed below the surface of the perimeter so that they do not project beyond the perimeter. A hole 18 is provided through plate member 10 extending radially inwardly from the perimeter 15 to the circumferential inner wall surface 16 of the opening 11 and is located at the point where the opening 11 is most closely adjacent to the perimeter 15. The hole 18 receives an Allen type set screw 19 which passes therethrough and is also recessed below the surface of perimeter 15 in the applied position to avoid projecting beyond the perimeter. A bushing 27 may be provided in the mounting 10 and is set in adjacent the innermost end of hole 18 through which the set screw 19 passes.

The eccentrically located opening 11 is adapted to receive a removable insert member 20. The insert member closely fits the size of the opening 11 with the outer circumferential face 21 thereof engaging the inner circumferential face 16 of the opening. An outwardly directed annular flange 22 adjacent one face of the insert member engages in the undercut groove 12 to position the insert in the dog member 10 with both faces of the insert member substantially flush with the respective faces of the lathe dog member. Diametrically opposite detents 23 are provided on the surface of the annular face 21. These detents are engaged by the set screws 17 to fasten the insert in the lathe dog member and fix the insert against relative rotation or displacement. The insert member 20 is provided with a radially disposed hole 24 extending through the insert from the outer circumferential face 26 of a centrally located opening 25. This hole 24 is adapted to be disposed in axial alignment with threaded hole 18 through the narrow portion of the lathe dog member 10 so that the set screw 19 may be inserted through the bushed hole 18 and continue to extend into and through the threaded hole 24 to the central opening 25.

The central opening 25 in the lathe dog insert is adapted to receive a workpiece to be turned in the lathe and which is secured in the lathe dog by tightening the set screw 19 through the aligned holes 18 and 24 into rigid engagement with the workpiece. Thus the lathe dog turns with the workpiece and while the workpiece opening 25 in the insert 20 is centrally disposed, the opening 11 in the disc-shaped lathe dog member 10 is located substantially to one side of the center of the disc-like lathe dog so that the lathe dog in operation moves in an orbit about the center of the workpiece and the insert 20, since the centerline of the workpiece and the axis of the opening 25 are substantially coaxial, thereby functioning like a cam to obtain the sliding or wiping action necessary to its operation of pushing aside any member coming in contact therewith while it is rotating.

The insert member 20 may be provided in various sizes to accept workpieces of different sizes and for this purpose the inserts may be furnished in sets containing a plurality of such insert members with each insert having the same overall size, but each having a central opening 25 of a different size from the central opening of any other insert in the set and preferably graduated as to size to provide a selection of sizes in successive graduations affording complete sets of inserts adapted to fit any size work piece in increments of one sixteenth inch or one eighth inch, as preferred.

The lathe dog member 10 is provided with a laterally projecting pin 30 which extends outwardly from one face of the member 10. This projecting pin functions similarly to the usual tailpiece on a typical lathe dog and is adapted to engage into a radial slot provided in the usual face plate of a lathe to drive the lathe dog and associated workpiece in the manner typical of standard lathe operations and procedures in the average machine shop. The lathe dog member 10 is shown as being fabricated from a solid section disc-like member but this may be constructed as a hollow section, if preferred and preferably is made of aluminum, or similar metal, or if desired, the disc-like member 10 might be made from a suitable plastic material. In practice the lathe dog member 10 is statically balanced to provide the desired operation of the installation in practice.

From the foregoing it will be seen that a safety lathe dog has been provided which is in the form of a disc-like member having an eccentrically located opening in which is mounted any one of a set of removable insert members each of which has a centrally located opening for receiving a workpiece so that the workpiece and insert are on center with respect to the lathe centers, but the lathe dog being mounted off center moves in an orbit about the center of the workpiece to effect a sliding or wiping action with respect to any member coming into contact with the rotating lathe dog whereby to push such member away from possible injury rather than exert the striking force normally associated with the operation of the typical lathe dog heretofore.

What is claimed is:

1. A safety lathe dog comprising a generally circular disc-like member having a smooth imperforate peripheral surface and a circular opening extending through said disc and located in offset relation to the center of the disc-like member, an insert element removably mounted in said circular opening having a centrally located opening therethrough for a workpiece, fastening means securing the disc-like member to the insert and extending through the insert to engage the workpiece and secure both the disc-like member and the insert to the workpiece, a detent in the peripheral surface of the insert element and a fastener extending diametrically through the disc-like member engaging said detent to secure the insert element against displacement relative to said disc-like member, the offset relationship of the disc-like member and insert providing a camming action of the smooth imperforate peripheral surface of the disc-like member to move in an operative orbit about the workpiece whereby the disc-like member will function to push away any member coming in contact therewith by a rotary wiping action, said fastener and said fastening means being disposed below the peripheral surface of the disc-like member.

2. A safety lathe dog as set forth in claim 1 wherein said insert element comprises a set of members each having an outside diameter substantially similar to said circular opening and selectively mounted in said circular opening and each insert member has a central opening of a size different from that in any other member of said set to fit workpieces of differing sizes and each member having a detent for operative association with said fastener and a threaded opening for said fastening means.

* * * * *